Figure 1:
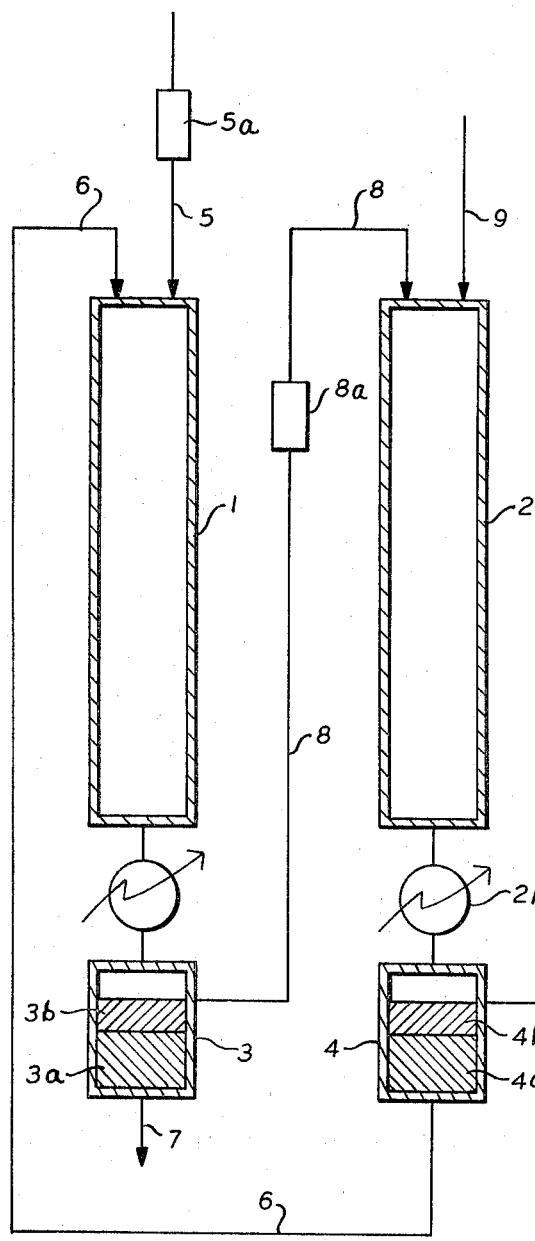

Jan. 10, 1967  K. SCHMITT ET AL  3,297,741
PROCESS FOR THE PURIFICATION OF TRIMETHYL ADIPIC DINITRILE
Filed Feb. 10, 1964

INVENTORS
KARL SCHMITT
JOSEF DISTELDORF
JOHANNES REIFFER
BY
Burgess, Dinklage & Sprung
ATTORNEYS.

United States Patent Office 3,297,741
Patented Jan. 10, 1967

3,297,741
PROCESS FOR THE PURIFICATION OF
TRIMETHYL ADIPIC DINITRILE
Karl Schmitt, Herne, Josef Disteldorf, Wanne-Eickel, and Johannes Reiffer, Essen-Heisingen, Germany, assignors to Scholven-Chemie Aktiengesellschaft, Gelsenkirchen-Buer, Germany, a corporation of Germany
Filed Feb. 10, 1964, Ser. No. 343,808
Claims priority, application Germany, Feb. 11, 1963, Sch 32,750, Sch 32,751
13 Claims. (Cl. 260—465.2)

In the conversion of trimethyl adipic acid with ammonia to the corresponding dinitrile, there is obtained, regardless of the process employed and whether liquid or gas phase reaction is employed, and whether the operation is batch or continuous, a crude product containing as a principal impurity trimethyl adipic acid imide. Removal of the imide from the crude product is possible, but in practice removal is accompanied by considerable difficulty and expense since azeotropic behavior is encountered so that if distillation is employed, large quantities of the dinitrile are distilled with the impurity. Further, the imide reacts to form the dinitrile very slowly so that very little of the imide can be converted to the dinitrile. Thus, in cyclic operation, there occurs a continuous and disturbing enrichment in the imide.

The instant invention is based on the concept of converting the imide into a form in which the resulting product can be conveniently separated from the dinitrile. It has been found that the imide-containing dinitrile, particularly imide-containing dinitrile obtained in the conversion of trimethyl adipic acid with ammonia, may be purified in a convenient manner if the crude product is treated with ammonia and water to convert the imide to the diamide. The diamide is practically insoluble in the dinitrile and can be easily separated therefrom. The conversion takes place in the cold in several hours. The diamide formed precipitates from the aqueous phase since it is only slightly soluble in water. A more rapid conversion of the imide is obtained by using higher temperatures. Then, besides diamide formation, saponification occurs to a small extent; the water-soluble ammonia salts of the trimethyl adipic acid and of the amide-acid are formed. The higher temperature which can be utilized for such processing can be about 100–200° C. It is advantageous to operate at temperatures of 180–200° C., since at these temperatures a single phase including the organic material and the aqueous ammonia is formed. Following a suitable time interval at the high temperature, the solution can be cooled, whereupon an aqueous phase separates. The reaction product of the impurity and the aqueous ammonia is then present in the aqueous phase. This reaction product is now soluble in the aqueous phase since the saponification has occurred and imparted solubility to the system.

The purification according to the invention is particularly suitable for continuous operation. Thus, appropriately, the ammonia water of suitable concentration, e.g., 10–30% ammonia, and the crude dinitrile can be separately brought to the reaction temperature and then passed through a reactor which is of a size and shape to provide a residence time suitable for substantially total conversion of the impurity. The pressure is selected so that liquid phase is maintained; the pressure substantially corresponds to the vapor pressure of the ammonia-water material. Depending on the concentration of ammonia and the reaction temperature, in general, the pressure is about 5–30 atmospheres.

A further feature of the invention is to provide a procedure for removal of impurity other than the imide of the adipic acid. In the production of the dinitrile from trimethyl adipic acid, the starting material, i.e., the trimethyl adipic acid, can be an oily mixture obtained by the oxidation of trimethyl cyclohexanol and/or trimethyl cyclohexanone with nitric acid. The immediate product of the nitric acid oxidation can be separated into an aqueous phase and an oily phase, the oily phase can then be swept to remove residual nitrous gases therefrom, and the resulting, clean-up oily phase can be used in the process for production of the dinitrile. The oily phase as well as containing the desired trimethyl adipic acid, contains as impurity shorter chain dicarboxylic acids, particularly trimethyl glutaric acid. In the condensation wherein the adipic acid is converted to dinitrile, there is formed, as by-product, the already mentioned imide of the trimethyl adipic acid, and from the said shorter chain acids, likewise the corresponding imides. While the imide of the trimethyl adipic acid, as has been described above, can be separated by means of ammonia and water, the imides of the shorter chain acids do not respond to such treatment, and hence cannot be removed thereby.

According to the invention, the impurities resulting from the presence of the shorter chain acids can be removed by use of alkali solutions. Thus, where the dinitrile is made by contacting ammonia with trimethyl adipic acid contained in an oily material, the crude dinitrile so produced can be first subjected to contacting with aqueous ammonia to remove imide impurity, and can thereafter be contacted with alkali solution to remove the corresponding imide impurity of shorter chain acids than the adipic acid. The alkali solution can be an aqueous solution of about 10–25% concentration. The temperature for the contacting with alkali solution can be from about room temperature to about 100° C., and is preferably between about 20–50° C.

In the production of dinitrile it is to be contemplated that the trimethyl adipic acid imide removed from the crude product will be returned to the condensation process for conversion thereof to the desired diamide. In respect to such operation, the removal of the imides of the shorter chain acids, in a treatment step separate from the treatment step in which the trimethyl adipic acid imide is removed, is therefore important, since such processing provides the trimethyl adipic acid imide separate from imides of shorter chain acids which would not be useful in the condensation. Recycling of the imides of the shorter chain acids is, desirably, avoided, and the procedure of the invention permits recycling of the trimethyl adipic acid imide without the necessity of recycling the imides of the shorter chain acids.

The impurities which may be present in the crude dinitrile produced from oily trimethyl adipic acid are in the order of magnitude of, for example, 3–8%. By processing as is described above, the impurity content can be decreased to 0.25% or below, depending upon the extensiveness of the purification treatments. Thus, further processing of the dinitrile, by, for example, distillation, is facilitated.

Figure 2:
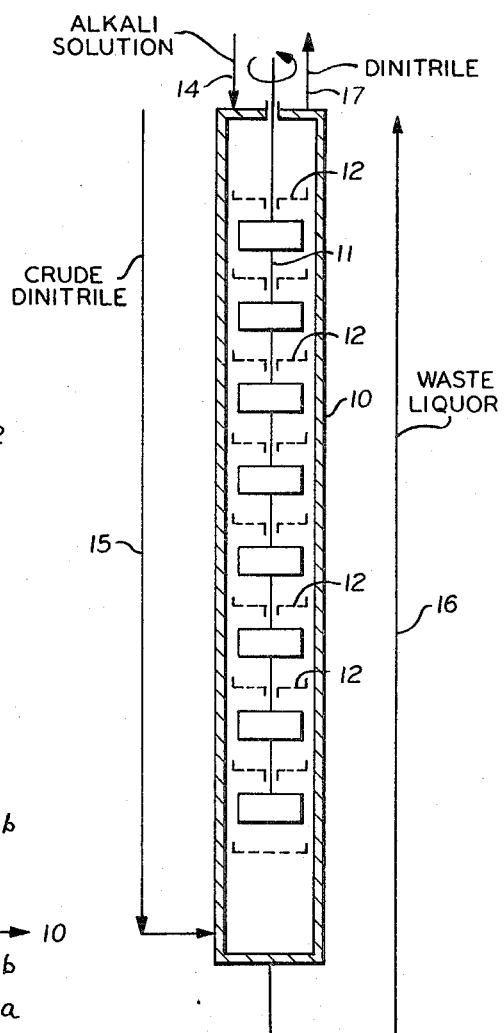

The invention is further described in the accompanying drawings, wherein:

FIG. 1 is a flow sheet for the treatment according to the invention wherein crude dinitrile is contacted with aqueous ammonia; and FIG. 2 is a schematic representation of an extractor which can be utilized for the contacting of crude dinitrile with alkali solution.

Referring to FIG. 1, in the process represented here, counter-current flow is utilized to assure substantially complete removal of the imide; simultaneously economy with respect to the washing agent is realized. Fresh trimethyl adipic acid can be added to the aqueous reaction product produced in this procedure, and the resulting admixture can be fed to the condensation to dinitrile.

After preheating in a heater 5a, the crude dinitrile is introduced into reactor 1 via line 5. Washing agent from reactor 2 is passed through line 6 to reactor 1. The washing water, aqueous ammonia, and the crude dinitrile flow downwardly through the reactor 1 and pass from the reactor into separator 3. In the separator, an aqueous phase 3a, containing all of the hydrolysis products, forms as an oil layer and is drawn off through line 7. The withdrawn aqueous phase can be combined with fresh trimethyl adipic acid and then subjected to the condensation process for the production of dinitrile. The upper phase in the separator 3 is an organic phase containing the dinitrile, and this material is withdrawn from the separator through line 8 and is passed to the top of reactor 2. The aqueous phase passed to the reactor 2 is heated in heater 8a. Aqueous ammonia is introduced into the top of reactor 2 via line 9. The aqueous ammonia and the crude dinitrile from line 8 pass downwardly through reactor 2 and from this reactor pass via line 2a to a cooler 2b. From the cooler 2b, the effluent of reactor 2 passes into separator 4, wherein the aqueous layer 4a and the organic layer 4b form. The resulting aqueous phase is pumped through line 6 to the top of reactor 1, while the organic phase can be passed via line 10 to further working up, as by distillation.

Whereas the processing represented in FIG. 1 utilizes two washing stages and provides counter flow with respect to these two stages, more than two washing stages can be utilized, while at the same time counter flow is employed.

Referring to FIG. 2, there is here shown an extractor suitable for use in treating crude dinitrile with aqueous alkali to remove from the crude dinitrile shorter chain acid imides. The extractor 10 is outfitted with a stirrer 11 and includes 9 extraction stages 12. For the feed and withdrawal of material to the extractor, alkali solution inlet 14, crude dinitrile inlet 15, dinitrile outlet 17, and waste liquor outlet 16 are provided, and these lines are connected to the extractor in a manner to provide for counter flow of the materials through the extractor.

The invention is further described in the accompanying examples.

EXAMPLE 1

In this example, aqueous ammonia is utilized to remove trimethyl adipic acid imide from crude dinitrile. 10 kg. of crude dinitrile derived from crystallized trimethyl adipic acid and having an imide content of 9.6% is stirred at room temperature with 5 kg. of 25% aqueous ammonia solution for 5 hours. Crystals of trimethyl adipic acid diamide are formed and are drawn off by suction. The filtrate is heated to 50° C. and then the liquid phases separated. The remaining 9.05 kg. of dinitrile is fed to a distillation treatment. The diamide crystals and an aqueous solution obtained by concentrating the aqueous effluent of the separation step, by evaporation, are returned to a dinitrile producing step.

EXAMPLE 2

In this example aqueous ammonia is utilized to remove imide impurity according to the invention. Referring to FIG. 1, the reactors 1 and 2 each have a capacity of 1 l. 4 kg. per hour of crude dinitrile are introduced into reactor 1 via line 5. The imide content of this crude dinitrile is 9.2%. 0.6 kg./hr. of 25% aqueous ammonia solution is introduced into reactor 2 via line 9. A temperature of 180° C. is maintained in the reactors and a temperature of 50° C .is maintained in the separators. Following counter current flow through the reactors, the dinitrile product is withdrawn from separator 4 via line 10 in amount of 3.6 kg./hr., while 1 kg./hr. of aqueous phase is withdrawn from separator 3 via line 7.

EXAMPLE 3

In this example, aqueous alkali solution is utilized to remove from a crude dinitrile, imide impurities of dicarboxylic acids of a chain length less than the chain length of adipic acid. The crude dinitrile which is the starting material in this example is a product of a dinitrile process wherein the dinitrile is produced by contacting ammonia with an oily material containing trimethyl adipic acid, and the crude dinitrile immediately resulting from the contacting with ammonia has been treated with aqueous ammonia, as is described in Example 1, to separate therefrom imide of trimethyl adipic acid. The starting material for this example in amount of 10 kg. is admixed with 2 kg. of 20% soda lye and the admixture is stirred vigorously for about 30 minutes. The initial concentration of the shorter chain imides was 6.5%. Following separation of the aqueous and organic phases, the organic phase containing the dinitrile still contained 0.25% of the shorter chain imides, and the loss of dinitrile by reason of its being taken up in the aqueous phase amounted to only 0.3%, which is according to the solubility of the dinitrile in the aqueous phase.

EXAMPLE 4

In this example, aqueous alkali is utilized to remove shorter-chain imide impurities, utilizing an extractor as is shown in FIG. 2. The extractor has a total volume of 7 l. 4 kg./hr. of crude dinitrile, previously freed of trimethyl adipic acid imide impurity as is described in Example 1, is introduced into the bottom of the extractor 10, while 0.5 kg./hr. of 20% soda lye are introduced into the top of the extractor. The aqueous phase forms the continuous phase, while the organic phase is dispersed in the aqueous phase. The dinitrile product of the extraction contains only 0.03% of the undesirable amides, and the loss of dinitrile is only 0.18%.

The crude dinitrile treated in Example 3 and Example 4, as is indicated above, is a crude material resulting from contacting with ammonia, an oily mixture containing trimethyl adipic acid. This oily mixture is produced by oxidation of trimethyl cyclohexanol or trimethyl cyclohexanone or mixtures of these cyclohexane derivatives, with nitric acid. The oily mixture is obtained by cooling the reaction product of the oxidation to, for example, 20° C. This occasions a separation to provide an organic phase and an aqueous phase. The aqueous phase can be separated from the organic phase, and the organic phase can then be swept with a gas, such as air, nitrogen, or steam, to remove from the oil, nitrous gases. The oil so obtained is substantially a mixture of the isomers $\alpha,\alpha,\gamma$- and $\alpha,\gamma,\gamma$-trimethyl adipic acid, and by-products, particularly short chain dicarboxylic acids. The production of the 2,2,4- and 2,4,4-dinitrile takes place in the liquid phase; the conditions for carrying out the reaction for this production substantially correspond to those known for production of adipic dinitrile from adipic acid. The most favorable reaction temperature for the dinitrile production process is about 230–270° C. As catalysts, the catalysts customary for the production of adipic dinitrile can be used. Thus, acid catalysts, such as phosphoric acid or materials containing phosphoric acid, and the like, can be used.

Thus, the invention provides a process for the purification of crude trimethyl adipic dinitrile containing as impurity trimethyl adipic acid imide. The process involves contacting the crude dinitrile with aqueous ammonia, and the proportion of aqueous ammonia to dinitrile is such as to provide an organic phase and an aqueous phase at low temperature, for example about 50° C. The contacting is at a contacting temperature which can be either said low temperature or a higher temperature, for example a high temperature of 200° C. The contacting is for a time sufficient for reaction of the imide with the aqueous ammonia to form a reaction product which is present in the aqueous phase upon providing the crude dinitrile and aqueous ammonia at said low temperature. The entire contacting can be carried out at a low temperature, or, as is described above, the contacting can be carried out first at a high temperature whereat a single phase is present, and then at a low temperature suitable for the separation into two phases.

The invention further provides a procedure for purification of crude trimethyl adipic dinitrile containing as impurity imide of shorter chain dicarboxylic acids, for example trimethyl glutaric acid imide. This procedure involves contacting the crude dinitrile with aqueous alkali solution in a proportion to provide an aqueous phase and an organic phase. This contacting is at a temperature and for a time sufficient for reaction of the imide with the alkali solution to form a reaction product taken up in the aqueous phase.

While the invention has been described with reference to particular embodiments thereof, these embodiments are merely representative and do not serve to set forth the limits of the invention.

What is claimed is:

1. Process for the purification of crude 2,2,4- and 2,4,4-trimethyl adipic dinitrile containing as impurity $\alpha,\alpha,\gamma$- and $\alpha,\gamma,\gamma$-trimethyl adipic acid imide which comprises contacting the crude dinitrile with aqueous ammonia in a proportion to provide an organic phase and an aqueous phase at low temperature, said contacting being at a contacting temperature and for a time sufficient for reaction of the imide with the aqueous ammonia to form a reaction product which is present in the aqueous phase upon providing the crude dinitrile and aqueous ammonia at said low temperature.

2. Process according to claim 1, the contacting temperature being about 10–200° C.

3. Process according to claim 1, the crude dinitrile being produced by reaction of trimethyl adipic acid with ammonia.

4. Process according to claim 1, the contacting temperature being about 10–40° C., said reaction product separating by precipitation thereof.

5. Process according to claim 1, the contacting temperature being about 100–200° C., said resulting product going into solution in the aqueous ammonia.

6. Process according to claim 1, the said phases being moved in counter current flow during said contacting.

7. In a process for production of 2,2,4- and 2,2,4-trimethyl adipic dinitrile which comprises contacting $\alpha,\alpha,\gamma$- and $\alpha,\gamma,\gamma$-trimethyl adipic acid with ammonia at a reaction temperature and for a time sufficient for formation of the dinitrile and 2,2,4- and 2,4,4-trimethyl adipic acid imide as impurity, the improvement which comprises purifying the crude dinitrile made up of said dinitrile and impurity by contacting the crude dinitrile with aqueous ammonia in a proportion to provide an organic phase and an aqueous phase at low temperature, said contacting being at a contacting temperature and for a time sufficient for reaction of the impurity with the aqueous ammonia to form a reaction product which is present in the aqueous phase upon providing the crude dinitrile and aqueous ammonia at said low temperature.

8. Process for the purification of crude 2,2,4- and 2,4,4-trimethyl adipic dinitrile containing as impurity trimethyl gultaric acid imide which comprises contacting the crude dinitrile with aqueous alkali solution in a proportion to provide an organic phase and an aqueous phase, said contacting being at a temperature and for a time sufficient for reaction of the imide with the alkali solution to form a reaction product taken up in the aqueous phase.

9. In the production of 2,2,4- and 2,4,4-trimethyl adipic dinitrile wherein an oil containing $\alpha,\alpha,\gamma$- and $\alpha,\gamma,\gamma$-trimethyl adipic acid and dicarboxylic acids of shorter chain lengths and derived by oxidation of a cyclohexane derivative selected from the group consisting of trimethyl cyclohexanol and trimethyl cyclohexanone and mixtures thereof, with nitric acid, is contacted with ammonia for reaction of the trimethyl adipic acid and ammonia to produce the corresponding dinitrile in a crude dinitrile product, the crude dinitrile further containing as impurity $\alpha,\alpha,\gamma$- and $\alpha,\gamma,\gamma$-trimethyl adipic acid imide and imides of shorter chain dicarboxylic acids, and wherein $\alpha,\alpha,\gamma$- and $\alpha,\gamma,\gamma$-trimethyl adipic acid imide is separated from the crude dinitrile, the improvement which comprises removing said imides of shorter chain dicarboxylic acids by contacting the crude dinitrile from which $\alpha,\alpha,\gamma$- and $\alpha,\gamma,\gamma$-trimethyl adipic acid imide has been removed with aqueous alkali solution in a proportion to provide an organic phase and an aqueous phase, said contacting being at a temperature and for a time sufficient for reaction of the imide with the alkali solution to form a reaction product taken up in the aqueous phase.

10. Process according to claim 9, the alkali solution being about 10–25% alkali.

11. Process according to claim 9, the contacting with alkali solution being at a temperature less than about 100° C.

12. Process according to claim 9, in the contacting with alkali solution, the said phases being moved in counter current flow.

13. Process according to claim 9, wherein $\alpha,\alpha,\gamma$- and $\alpha,\gamma,\gamma$-trimethyl adipic acid imide is separated from the crude dinitrile by contacting the crude dinitrile with aqueous ammonia in a proportion to provide an organic phase and an aqueous phase at low temperature, said contacting being at a contacting temperature and for a time sufficient for reaction of the imide with the aqueous ammonia to form a reaction product which is present in the aqueous phase upon providing the crude dinitrile and aqueous ammonia at said low temperature.

References Cited by the Examiner

UNITED STATES PATENTS

| 2,132,849 | 10/1938 | Greenewalt et al. | 260—465.2 |
| 2,794,043 | 5/1957 | Jansen et al. | 260—465.2 |
| 2,808,426 | 10/1957 | Potts et al. | 260—465.2 |

FOREIGN PATENTS

| 1,111,163 | 7/1961 | Germany. |

CHARLES B. PARKER, *Primary Examiner.*

JOSEPH P. BRUST, *Examiner.*